US006996217B2

(12) United States Patent
Goldman

(10) Patent No.: US 6,996,217 B2
(45) Date of Patent: Feb. 7, 2006

(54) CONVERTING AUTOMATIC NUMBER IDENTIFICATION INFORMATION TO CALLER ID INFORMATION

(75) Inventor: Phillip Y. Goldman, Los Altos, CA (US)

(73) Assignee: Unblockable, Inc., Los Altos, CA (US)

( * ) Notice: Subject to any disclaimer, the term of this patent is extended or adjusted under 35 U.S.C. 154(b) by 419 days.

(21) Appl. No.: 10/080,347

(22) Filed: Feb. 21, 2002

(65) Prior Publication Data

US 2003/0156693 A1 Aug. 21, 2003

(51) Int. Cl.
*H04M 1/56* (2006.01)

(52) U.S. Cl. ........................... 379/142.01; 379/127.01; 379/207.15

(58) Field of Classification Search ............ 379/127.02, 379/127.01, 126, 142.01, 142.02, 142.04, 379/142.06, 127.03, 127.06, 127.05, 142.17, 379/142.1, 201.08, 201.02, 201.01, 207.15, 379/207.13, 207.14

See application file for complete search history.

(56) References Cited

U.S. PATENT DOCUMENTS

| | | | | | |
|---|---|---|---|---|---|
| 4,090,034 | A | * | 5/1978 | Moylan | 379/127.01 |
| 5,033,076 | A | * | 7/1991 | Jones et al. | 379/172 |
| 5,046,088 | A | * | 9/1991 | Margulies | 379/127.01 |
| 5,163,087 | A | * | 11/1992 | Kaplan | 379/93.03 |
| 5,341,414 | A | * | 8/1994 | Popke | 379/142.01 |
| 5,521,969 | A | * | 5/1996 | Paulus et al. | 379/142 |
| 5,533,106 | A | * | 7/1996 | Blumhardt | 379/142 |
| 5,537,470 | A | | 7/1996 | Lee | 379/266 |
| 5,550,905 | A | | 8/1996 | Silverman | 379/142 |
| 5,563,931 | A | * | 10/1996 | Bishop et al. | 379/142.01 |
| 5,734,706 | A | | 3/1998 | Windsor et al. | 379/142 |
| 5,799,060 | A | * | 8/1998 | Kennedy et al. | 379/142 |
| 5,809,121 | A | | 9/1998 | Elliott et al. | 379/127 |
| 5,875,240 | A | | 2/1999 | Silverman | 379/142 |
| 5,901,207 | A | | 5/1999 | Pickeral | 379/127 |
| 5,901,209 | A | | 5/1999 | Tannenbaum et al. | 379/142 |
| 5,903,636 | A | | 5/1999 | Malik | 379/142 |
| 5,907,605 | A | * | 5/1999 | Ramirez et al. | 379/142 |
| 5,974,115 | A | * | 10/1999 | Chan et al. | 379/27 |
| 5,982,866 | A | | 11/1999 | Kowalski | 379/127 |
| 6,018,668 | A | | 1/2000 | Schmidt | 455/518 |
| 6,078,646 | A | * | 6/2000 | McLaughlin et al. | 379/142 |
| 6,137,870 | A | | 10/2000 | Scherer | 379/127 |
| 6,175,620 | B1 | | 1/2001 | Rouge et al. | 379/207 |
| 6,178,232 | B1 | | 1/2001 | Latter et al. | 379/88.21 |
| 6,198,812 | B1 | | 3/2001 | Weber | 379/142 |
| 6,233,325 | B1 | | 5/2001 | Frech et al. | 379/111 |
| 6,259,779 | B1 | | 7/2001 | Council et al. | 379/121 |
| 6,301,480 | B1 | * | 10/2001 | Kennedy et al. | 455/445 |
| 6,310,943 | B1 | * | 10/2001 | Kowalski | 379/127.03 |
| 6,324,271 | B1 | | 11/2001 | Sawyer et al. | 379/142.05 |
| 6,332,021 | B2 | | 12/2001 | Latter et al. | 379/142.01 |
| 6,421,428 | B1 | * | 7/2002 | Carman et al. | 379/88.2 |

* cited by examiner

*Primary Examiner*—Rexford Barnie
(74) *Attorney, Agent, or Firm*—Workman Nydegger

(57) ABSTRACT

A telephone system for reliably providing caller identification information to telephone call recipients such that they can choose whether or not to answer a telephone call. The telephone system includes a decoder module for receiving a toll-free telephone call and decoding automatic number identification (ANI) information included within the toll-free telephone call. The system also includes a converter module for converting the decoded ANI information into caller ID information. The system also includes a forwarding module for making an outgoing telephone call to a toll-based telephone number of the call recipient and sending the audio data of the original toll-free telephone call and the caller ID information with the outgoing telephone call. In this manner, ANI information is used to generate caller ID information even if the calling party has blocked its caller ID information.

5 Claims, 3 Drawing Sheets

CONVERTING AUTOMATIC NUMBER IDENTIFICATION INFORMATION TO CALLER ID INFORMATION

BACKGROUND OF THE INVENTION

1. The Field of the Invention

This invention relates generally to the field of telecommunications. In particular, embodiments of the present invention relate to a system of converting automatic number identification (ANI) information into caller identification (caller ID) information.

2. Background and Related Art

Telephone identification services are used to provide information about a calling party to a call recipient. Identification services arose out of a need for call recipients to have information about the caller before answering a telephone call. In a residential setting, this interest pertains to an individual's desire to avoid contact with salespeople and other undesired callers. Businesses typically use toll-free telephone numbers to allow clients to contact them at no cost to the clients. These toll-free telephone numbers charge the call recipient rather than the caller for the fees associated with a particular call. This creates an even stronger need for businesses that use a toll-free telephone number to avoid answering undesired calls by receiving information about the caller before accepting the call.

There are two common types of telephone identification services currently used in the United States. Caller ID is a residential identification service which provides the telephone number and name of the caller to the call recipient. Individuals must subscribe to a caller ID service plan and configure their telephones with devices that display the caller ID information. If a telephone number is designated as a subscriber to caller ID, the telephone company sends a data packet relating to the identification of the caller while the telephone is ringing. The data packet is generated by the telephone company who can identify the telephone number of a caller and the owner of that telephone number. The data packet is decoded by an external display device or an internal device within the telephone that displays the caller ID information. This service then allows the recipient to visually inspect the identification of the caller before deciding whether or not to answer the telephone.

Unfortunately, caller ID is not very effective in practice at providing the identification of callers that residential subscribers most likely wish to avoid. Telephone companies allow anyone to conceal their caller ID information for a small monthly fee. Most telemarketing companies realize that people do not wish to receive their calls and therefore conceal their caller ID information, in an effort to make it more likely that people will continue to accept their telephone solicitations. This practice of allowing any company or individual to conceal their caller ID information undermines the entire purpose of caller ID.

In addition, many regional telephone companies do not provide caller ID services for incoming telephone calls that originate from out of the companies' area of operation. Call recipients of such regional telephone companies are therefore unable to determine the identity of many callers. Moreover, caller ID operates as part of a cooperative system, and callers or telephone companies, with the appropriate equipment, can spoof a telephone number such that caller ID information can be altered or circumvented. In any of these situations, the call recipient is unable to determine the identify of the caller.

The second telephone information service is called automatic number identification (ANI). This service is designed to enable owners of toll-free telephone numbers or other numbers, such as premium service telephone numbers, to identify callers. A toll-free telephone number is a telephone number that charges the call recipient for all incoming calls rather than the caller. Currently, toll-free telephone numbers begin with one of several non-geographic area codes, which include 800, 866, 877 and 888. Premium service telephone numbers include those with a non-geographic area code of 900, many of which offer information or services for a fee paid by the caller based on the duration of the call.

Like caller ID, the ANI service attaches additional information to telephone calls to enable the call recipient to determine whether or not to accept the call. The ANI information may contain more than just the name and telephone number of the caller; it may contain certain billing information, such as a caller's current balance with the call recipient. Also like caller ID, the ANI information may be visually displayed on a computer or other device that is configured to decode the ANI information. Unlike caller ID, ANI information cannot easily be blocked by individuals or companies who wish to remain anonymous. Also unlike caller ID, telephone companies do not offer any form of blocking service which universally blocks ANI information from being transmitted. ANI provides a virtually guaranteed method of obtaining the identity of a caller before determining whether to answer a telephone call.

While ANI offers an alternative to caller ID, ANI is typically only offered on relatively expensive telephone lines, such as T-1 lines. Expensive private branch exchange (PBX) equipment that is generally impractical for residential use is required to decode ANI information. Thus, residential call recipients are typically limited to caller ID information rather than ANI to identify callers and, accordingly, often are unable to receive the caller ID information, particularly for telephone calls that are likely to be unwanted.

Therefore, there is a need for a system that provides the reliable caller identification information of ANI but is consistently available to residential users like caller ID. Such a system should be cost effective, user friendly and conforming to current FCC regulations.

BRIEF SUMMARY OF THE INVENTION

These and other problems in the prior art are addressed by embodiments of the present invention, which relates to a system for reliably providing caller identification information to telephone call recipients such that they can choose whether or not to answer a telephone call. In addition, the system provides a call recipient with the ability to obtain identification information about a caller even if the caller has blocked his caller ID information or is out of area.

In one presently preferred embodiment, the system includes providing each call recipient who subscribes to the service with a toll-free telephone number in addition to the standard residential toll-based telephone number, of destination number, assigned to the call recipient. The toll-free telephone number is then used by the call recipient in all situations when a telephone number must be given out in a public setting.

Whenever a caller calls the toll-free telephone number, ANI information pertaining to the caller's telephone number is automatically included with the telephone call even if the caller has disabled his caller ID. The system receives the included ANI information but does not yet accept or take the telephone call to an off-hook state. The received ANI information is converted into a caller ID data format. The system then calls out to the call recipient's destination number, spoofing the caller ID to that of the original caller, rather than the actual telephone number used by the server to call out to the destination number. The entire process is done in a time frame that is short enough that the caller ID information is displayed to the call recipient and the recipient has time to analyze the caller ID information before the caller assumes the recipient is not available. If the recipient decides to take his phone off hook to answer the call, the server in turn answers the telephone call received from the caller by going off hook and connects the two telephone calls. If the recipient decides not to answer the call, then likewise the server need not answer the original call, and thus no call is ever completed and no charges should occur.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Reference will now be made to the drawings to describe the presently preferred embodiment of the invention. It is to be understood that the drawings are diagrammatic and schematic representations of the presently preferred embodiment, and are not limiting of the present invention, nor are they necessarily drawn to scale.

In general, the present invention relates to a system for reliably providing caller identification information to telephone call recipients such that they can choose whether or not to answer a telephone call. In addition, the system provides call recipients with the ability to obtain identification information about a caller even if the caller has blocked his caller ID information. Also, while embodiments of the present invention are described in the context of a telephone system for the purpose of reliably providing caller identification information to call recipients, it will be appreciated that the teachings of the present invention are applicable to other applications as well.

The following discussion is intended to provide a brief, general description of a suitable computing and communications environment in which the system may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

Figure 1:
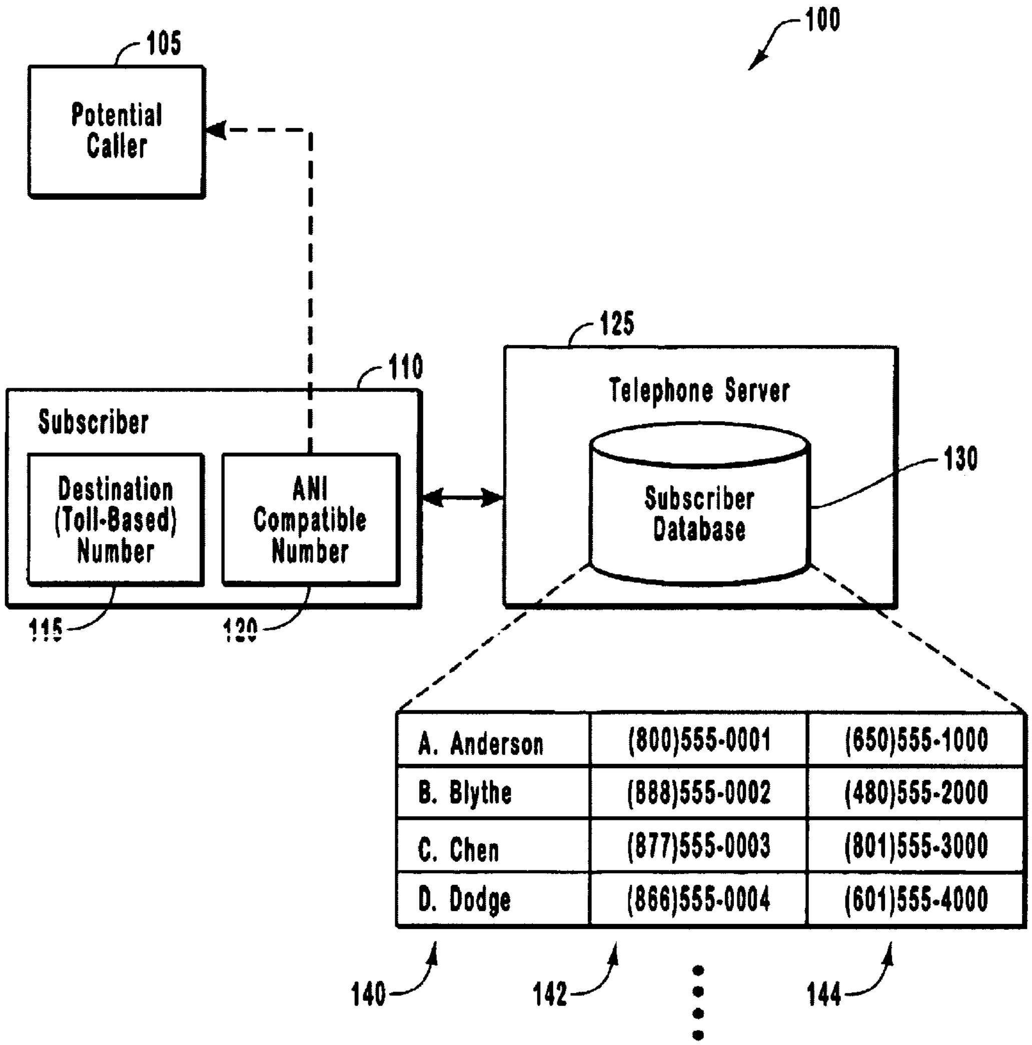
FIG. 1 is an environment diagram for a system according to the invention for reliably providing caller identification information to call recipients such that they can choose whether or not to answer a telephone call.

Reference is first made to FIG. 1, which illustrates an environment diagram for the system for reliably providing caller identification information to call recipients such that they can choose whether or not to answer a telephone call, designated generally at 100. FIG. 1 illustrates the relationships between the subscriber 110, potential caller 105 and the telephone server 125 that are established as a subscriber becomes associated with the invention and prior to a telephone call being processed. The subscriber 110 is an individual or business that wishes to receive reliable identification information about all potential callers before answering a telephone call. As used herein, the term "subscriber" refers to any call recipient who has access to or receives the caller identification information services described herein.

The subscriber 110 is assigned a telephone number that is compatible with receiving automatic number identification information. This telephone number is illustrated in FIG. 1 as ANI compatible telephone number 120. In general, the term "ANI compatible telephone number," as used herein, extends to toll-free telephone numbers, premium service telephone numbers (e.g., "900" numbers) and other such telephone numbers that, when used by callers to make telephone calls, receive ANI information associated with the caller. The subscriber 110 publishes ANI compatible telephone number 120 and/or gives this telephone number to potential callers. Thus, the ANI compatible telephone number 120 is used as an entryway to public callers.

Subscriber 110 also has a destination telephone number 115, which is, for example, a toll-based telephone number, and may be the subscriber's residential number, mobile number, work number, business number, etc. In general, destination telephone number 115 is associated with the telephone or telephones that the subscriber uses to receive a telephone call while learning of the identify of the caller using the caller identification services of the invention. An incoming telephone call to the subscriber's ANI compatible telephone number is connected to a call placed from the telephone server 125 to the destination telephone number 115 as will be described below in greater detail in reference to FIGS. 2 and 3.

Figure 2:
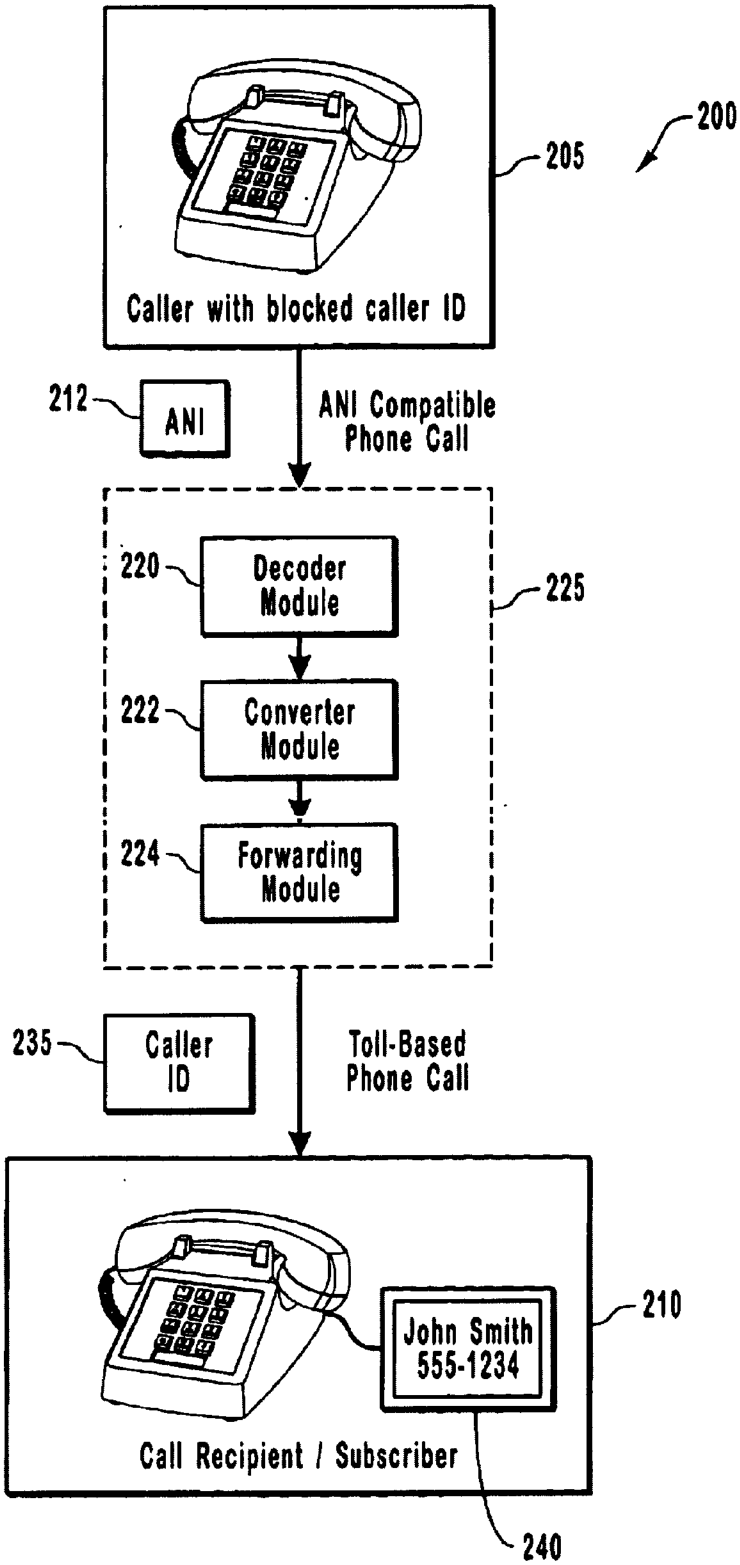
FIG. 2 is a diagram depicting a system for reliably providing caller identification information to call recipients such that they can choose whether or not to answer a telephone call.

Reference is next made to FIG. 2, which further illustrates the system for reliably providing caller identification information to call recipients, designated generally at 200. A caller 205, or calling party, is any individual, business or computer that initiates a telephone call. The call may be initiated from a conventional telephone or a computer switching service. Caller ID is a service provided by each regional telephone company that allows anyone to obtain identification information about a caller before accepting a telephone call. The service generally costs between $5 and $10 a month for anyone who wishes to receive this information. Telephone companies generally also provide a service to block out a subscriber's caller ID information from being transmitted to a call recipient. This service also generally costs between $5 and $10 a month. The caller 205 in FIG. 2 has paid to have his caller ID blocked from being sent out to call recipients. If a caller subscribes to the caller ID blocking service, anyone he or she calls will not be able to receive the caller ID information. For example, a telemarketer who knows that his telephone calls at 7 pm are generally undesirable will likely pay for the caller ID blocking service, such that the recipients of his calls will be forced to listen to his sales pitch. The system illustrated in FIG. 2 works the same whether the caller has blocked his caller ID or not.

With continued reference to FIG. 2, the caller 205 calls a ANI compatible telephone number associated with a particular subscriber 210 to attempt to establish an audio connection with the subscriber. Whenever a caller 205 calls a ANI compatible telephone number, ANI information is sent in addition to the audio data. Therefore, the toll-free telephone call includes both ANI information and an audio connection with audio data. The ANI information includes identification information about the caller 205 and, unlike caller ID, cannot be blocked by the caller by simply paying a small fee to the telephone company. Since the caller 205 is calling a ANI compatible telephone number in the illustrated example, ANI information 212 is automatically sent as part of the telephone call. The ANI information is generated by the telephone company that processes and transmits the telephone call from caller 205. The telephone company has the ability to identify where a telephone call originates from and who is the owner of that telephone number.

The audio connection and the ANI information 212 from the caller 205 are initially sent to telephone server 225. The telephone server 225 is a computerized telephone system that processes and routes telephone calls made to numerous ANI compatible telephone numbers from one physical location. According to the invention, the telephone server 225 can be operated by an entity that is separate from the telephone company or companies that process and transmit telephone calls from callers. Indeed, the telephone server 225 can be operated without the express cooperation of such telephone companies and enables caller ID information to be inserted into telephone calls from which caller ID information would otherwise be blocked by the telephone company.

The telephone server 225 in the described system does not take telephone calls received from caller 205 into an off-hook state, but rather simply processes the ANI information contained within the telephone calls. As described above, ANI compatible telephone numbers are assigned to subscribers of the system, such that the telephone server 225, which receives all toll-free telephone calls on behalf of subscribers, eventually routes the telephone calls on to the destination telephone numbers associated with the ANI compatible telephone numbers. Once a telephone call is detected on one of the ANI compatible telephone numbers monitored by the telephone server 225, the telephone server 225 receives the ANI information 212 that automatically accompanies the toll-free telephone call.

With continued reference to FIG. 2, the telephone server 225 is equipped with a decoder device or module 220 that decodes the ANI information 212 into text based strings. This device may be implemented using computer software or a hardware device. A data string is a memory unit that is capable of storing a series of alphanumeric characters. The telephone server 225 first analyzes the strings and selects the strings which pertain to the identity of the caller. The telephone server 225 then utilizes a encoder device or module 222 to encode the phone number into caller ID format, thereby generating a caller ID information 235. Caller ID has a standard data format that can be received and displayed by numerous telephones and caller ID boxes. Those of skill in the art, upon learning of the disclosure made herein, will understand how to convert the ANI information or the strings derived therefrom to caller ID information.

The telephone server 225 includes a forwarding device or module 224 that forwards the audio connection portion of the original toll-free telephone call and the caller ID information 235 to the subscriber 210. As used herein, the term "forward" refers to any appropriate process for transmitting the audio data from the original incoming telephone call and the caller ID information to the call recipient using the destination telephone number.

In order to determine the destination telephone number that is to receive the audio data of the incoming toll-free telephone call that has been received by telephone server 225, the telephone server uses a subscriber database, such as the database 130 illustrated in FIG. 1. Subscriber database 130 of FIG. 1 correlates destination (e.g., toll-based) telephone numbers 115 assigned to subscribers with ANI compatible (e.g., toll-free, premium service) telephone numbers 120 assigned to the subscribers. The subscriber database 130 is a standard database having, for example, three fields, including a subscriber's name field 140, an ANI compatible number field 142 that includes the ANI compatible telephone number associated with the particular subscriber, and a destination number field 144 that includes the destination telephone number associated with the particular subscriber and with the ANI compatible telephone number. Other fields may be useful such as a price per forwarded call, current balance, auxiliary destination or toll-based telephone number, etc.

In addition to a one-to-one correspondence between ANI compatible telephone numbers and toll-based, or destination, numbers assigned to subscribers, subscriber database 130 can include rules to determine how to make an outgoing call or to otherwise forward the audio data of the incoming toll-free telephone call to the call recipient. For instance, the database may allow one ANI compatible telephone number to be associated with multiple destination numbers, depending on the time of day, the calling party's ANI, or other criteria. In this manner, incoming calls are routed to a destination number (or numbers) that is most likely to be accessible by the call recipient. Similarly, the subscriber database 130 can associate multiple ANI compatible telephone numbers with a single destination telephone number and, accordingly, with a single call recipient. Other operations that can be performed on the incoming telephone call made to the ANI compatible telephone number based on the rules include, but are not limited to, generating an automatic busy signal, directing the calling party to voice mail, playing a recorded message, terminating the telephone call, and substantially any other operation that can be performed on an incoming telephone call.

The subscriber database 130 can also identify the corresponding subscriber with an ANI compatible telephone number. This may be useful in a billing scheme that bills subscribers per forwarded telephone call rather than a flat fee. Those skilled in the art will recognize that techniques other than the use of a subscriber database can be used to identify the destination telephone number to which the audio data of toll-free telephone call and the caller ID information are to be forwarded. For instance, telephone server 225 can use a set of rules defined by the subscriber or the service to identify the destination telephone number.

Referring now to FIG. 2, the forwarding module 224 of telephone server 225 performs the forwarding process, according to one embodiment, by making an outgoing telephone call from the telephone server 225 to call recipient 210 using the destination telephone number (e.g., the toll-based telephone number assigned to the call recipient). The audio data of the incoming toll-free call is connected to the outgoing telephone call made to the destination telephone number, such that the call recipient 210 receives the audio data and can communicate with caller 205 if the call recipient decides to accept the call. It is noted that this embodiment does not require the cooperation or assistance of the telephone company that has transmitted the incoming toll-free telephone call. Thus, transmitting the audio data in a new outgoing telephone call to call recipient 210 in this manner is performed by telephone server 225 rather than the telephone company, and is therefore different from conventional call forwarding services provided by the telephone company.

Preferably, but not necessarily, call recipient 210 is in the local calling area of telephone server 225, which enables the outgoing telephone call to be made to call recipient 210 without incurring long distance charges. In other words, the outgoing telephone call can be a local telephone call. If a large number of subscribers, particularly in a variety of geographic regions, are to receive the services described herein, multiple telephone servers can be operated in a variety of local calling areas to reduce or eliminate long distance charges.

In another embodiment, telephone server 225 can enlist the assistance of the telephone company by signaling to the telephone company that the incoming telephone call is to be forwarded to the destination number. In this case, the outgoing, forwarded telephone call can be made on a separate physical line or on a different channel of the same line as the incoming call.

In either case, the caller ID information 235 that has been converted by telephone server 225 is transmitted to call recipient 210 in addition to the audio data. Preferably, the incoming toll-free telephone call is forwarded as described above without being taken to an off-hook state or, in other words, without answering the incoming telephone call at the telephone server 225. In this manner, caller 205 continues to hear a ring signal as the audio data of the telephone call is forwarded and, in the event that the subscriber 210 is not available or decides not to answer the telephone call, the telephone server 225 and, indirectly, the subscriber 210, do not experience the costs that would otherwise be associated with answering the toll-free telephone call at the telephone server 225.

The subscriber 210 then receives the telephone call that has been made to the destination number and the converted caller ID information 235 indicating the identity of the caller. In the illustrated embodiment, the subscriber uses a caller ID device 240 to decode and visually display the identity information contained within the caller ID information 235. Alternatively, the subscriber 210 may utilize a telephone that incorporates a caller ID display within the handset or console. In any of these situations, the call recipient can use conventional residential or business telephone equipment that has caller ID display capabilities to learn of the identity of callers, including those who have blocked their own caller ID information. If the subscriber 210 decides to take his phone off hook to answer the call, the telephone server 225 in turn answers the telephone call received from the caller by going off hook and connects the two telephone calls. If the subscriber 210 decides not to answer the call, then likewise the telephone server 225 need not answer the original call, and thus no call is ever completed and no charges should occur.

In order to prevent callers from attempting to circumvent the caller ID systems of the invention, the telephone server 225 can take further measures to verify the identity of the caller. In particular, some callers in the past have avoided identification by spoofing the ANI, or telephone number, of another caller, thereby appearing to call recipients to be someone other than who they actually are. One way in which this practice can be avoided involves the telephone server 225 obtaining the purported telephone number of the caller from the ANI. The telephone server 225 then places a return telephone call to the purported telephone number of the caller to determine whether the purported telephone number has been spoofed or is the actual telephone number of the caller. In this embodiment, the outgoing telephone call to the call recipient 210 is made during or after the return telephone call to the purported telephone number of the caller.

Placing a return telephone call in this manner can verify the identity of the caller in one of a variety of ways. For example, if the return call is answered by someone other than the caller, the telephone server 225 can assume that the telephone number of the ANI has been spoofed. Alternatively, if the return call is answered by the caller or results in a busy signal (i.e., the telephone number is being used by the caller), the telephone server 225 can assume that the caller has been correctly identified and has not spoofed the telephone number. Any of the foregoing are examples of actions that determine whether the telephone number purportedly associated with the calling party is actually associated with the calling party.

Figure 3:
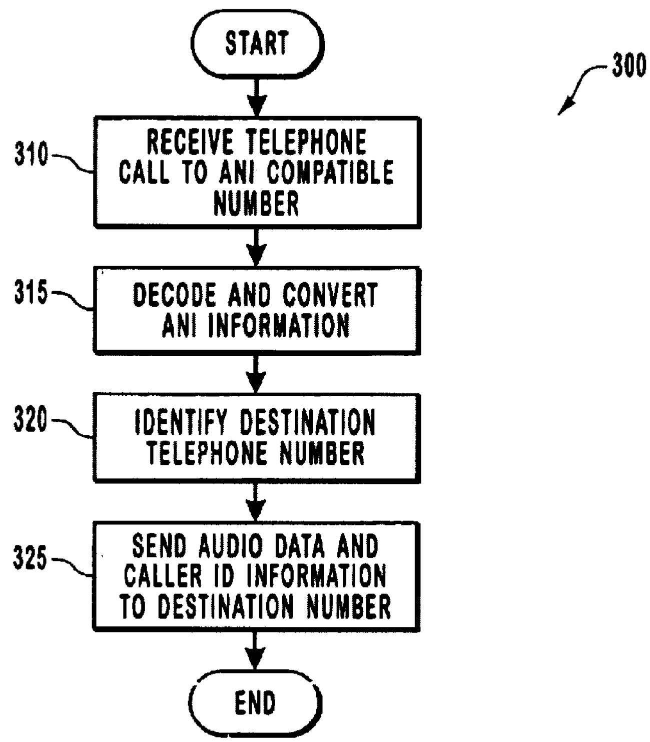
FIG. 3 is a logical flow chart illustrating a method performed according to the invention by a telephone server to convert ANI information to caller ID information and to forward a telephone call to a call recipient.

Reference is next made to FIG. 3, which illustrates a logical flow chart of one presently preferred embodiment of a process used by a telephone server for use in a system for reliably providing caller identification information to call recipients such that they can choose whether or not to answer a telephone call, designated generally at 300. The process begins when a toll-free telephone call is received by the telephone server in step 310. In step 315, the ANI information contained within the toll-free telephone call is decoded. Decoding ANI information includes separating the data into individual elements containing different types of data as described above in reference to FIG. 2. The elements are then converted from the ANI data format into a text based format. The text based information from each element is placed into a text based string.

Also according to step 315, the decoded ANI information to caller ID information. This process may utilize a textual comparison routine that identifies whether a text based string derived from the ANI information contains identification information about a caller. The selected text based strings are converted into caller ID information. The conversion of the selected text based strings utilizes, for example, a data map that stores compatible caller ID code for each alphanumeric character potentially contained within a text based string (as defined by the caller ID standards). The data map is used to convert each character of the selected strings into the caller ID information.

In step 320, the telephone server identifies the destination telephone number that is associated with the call recipient as described above in reference to FIGS. 1 and 2. In step 325, the telephone server routes the audio data of the incoming toll-free telephone call and the caller ID information that has been generated in step 315 to the destination telephone number.

Figure 4:
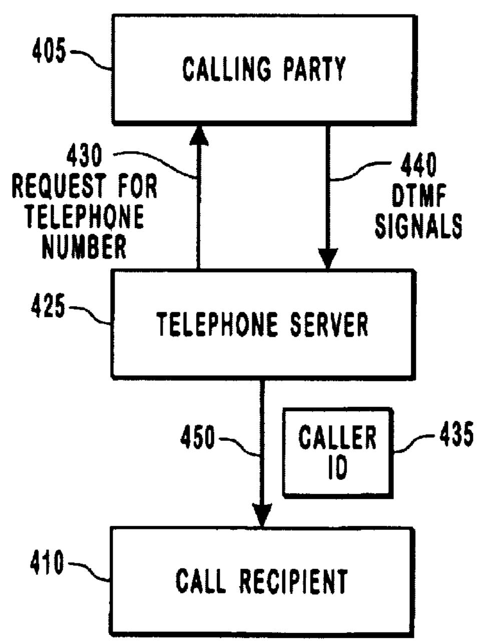
FIG. 4 is a diagram illustrating an alternative embodiment that requires callers having blocked caller ID to enter their telephone numbers.

FIG. 4 illustrates an alternative embodiment of the invention that eliminates the need to use ANI compatible telephone numbers, such as toll-free and premium service telephone numbers. In this embodiment, call recipient 410 is assigned a standard residential telephone number, such as a toll-based telephone number, which is to be used by members of the general public or others whose identifying information is to be communicated to the call recipient even if the callers have blocked their caller ID information. Incoming telephone calls from calling party 405 directed to call recipient 410 are received by telephone server 425. Telephone server 425 can be remotely located with respect to call recipient 410 and operated by an entity that does not require the cooperation of telephone companies, similar to that described above in reference to the embodiments of FIGS. 1–3. Rather than receiving and decoding ANI information, telephone server 425 screens the incoming telephone call to determine whether it is accompanied by caller ID information.

If the incoming telephone call is accompanied by caller ID information, the telephone call is forwarded as described above in reference to FIGS. 2 and 3, in that the audio data of the incoming telephone call is connected to an outgoing telephone call 450, along with the caller ID information 435 that was included in the original incoming telephone call. The outgoing telephone call may be made by the telephone server using a second standard toll-based telephone number assigned to the call recipient 410. Alternatively, the audio data may be transmitted to the call recipient using other forwarding techniques, examples of which have been described above in reference to FIGS. 2 and 3.

If, however, the incoming telephone call received by telephone server 425 does not include caller ID information because the calling party 405 has blocked its caller ID information or for other reasons, the audio data of the incoming telephone call is not immediately forwarded to call recipient 410. Instead, telephone server 425 communicates with the calling party 405 using the communication link established by the incoming telephone call and prompts the calling party as shown at 430 to enter its telephone number or other identifying information using dual-tone multi-frequency (DTMF) signals or voice capture and recognition or some other form of ID. Moreover the calling party 405 can be informed that the call cannot be received by caller 410 without appropriate identification of the calling party using the DTMF signals.

In response to the information communicated by telephone server 425, calling party 405 enters its identifying information, which is communicated by DTMF signals to telephone server 425 as shown at 440. Telephone server 425 then uses the information encoded in the DTMF signals to generate caller ID information 435, which is transmitted to call recipient 410 with outgoing telephone call 450. For instance, telephone server 425 can use the telephone number or other identifying information encoded in the DTMF signals 440 to perform a lookup operation in a telephone directory database or caller ID database that enables the telephone server to obtain a name associated with the identifying information. The database can be stored locally or accessed remotely, such as over the Internet. Those of skill in the art, upon learning of the invention disclosed herein, will understand these and other ways of generating caller ID information 435 that identifies the calling party 405. If names are not available, caller ID information 435 transmitted to call recipient 435 can include as little as the telephone number of the calling party 405, which enables call recipient 410 to perform some screening of incoming calls.

In yet another alternative configuration of the embodiment illustrated in FIG. 4, telephone server 425 is not included in the system as a separate entity. Instead, the operation of telephone server 425 is performed by computer equipment at the residence or place of business of call recipient 410. In particular, the request 430 for the telephone number of the calling party 405 can be issued by computer equipment associated with the telephone of the call recipient 410 upon determining that caller ID information is not included in the incoming telephone call from the calling party 405. Moreover, the lookup operations or other methods for identifying the calling party 405 based on the identifying information encoded in the DTMF signals can be performed locally.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a telephone server, a method for providing information that identifies a calling party to a call recipient, comprising the acts of:

receiving a telephone call from the calling party, wherein the telephone call is directed to a call recipient and includes information specifying a telephone number purportedly associated with the calling party;

making a return telephone call from the telephone server to the telephone number purportedly associated with the calling party to determine whether the telephone number is actually associated with the calling party; and only upon determining that the telephone number is actually associated with the calling party, connecting audio data of the telephone call received from the calling party to an outgoing telephone call made from the telephone sewer to a destination telephone number associated with the call recipient.

2. A method as defined in claim 1, further comprising the act of making the outgoing telephone call only upon determining that the telephone number is actually associated with the calling party.

3. A method as defined in claim 1, wherein the act of making the outgoing telephone call is conducted prior to determining that the telephone number is actually associated with the calling party.

4. A method as defined in claim 1, wherein the information specifying the telephone number comprises automatic number identification information.

5. A method as defined in claim 4, further comprising the acts of:

converting the automatic number identification information into corresponding caller ID information; and transmitting the caller ID information with the outgoing telephone call.

* * * * *